July 13, 1965                J. K. SHANNON                3,194,867
      METHOD OF CONSTRUCTING STORAGE BATTERY COVERS AND THE
           UNITING OF THE SAME WITH STORAGE BATTERY
                   CASES AND BATTERY ELEMENTS
Original Filed Feb. 20, 1961                    2 Sheets-Sheet 1
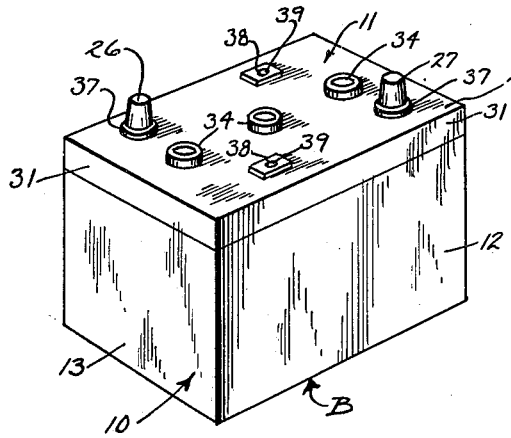
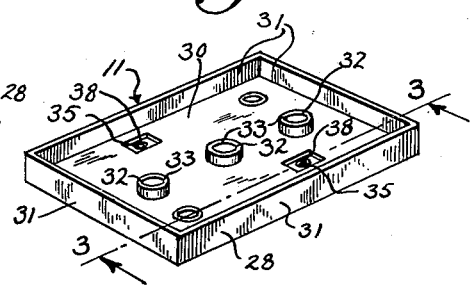
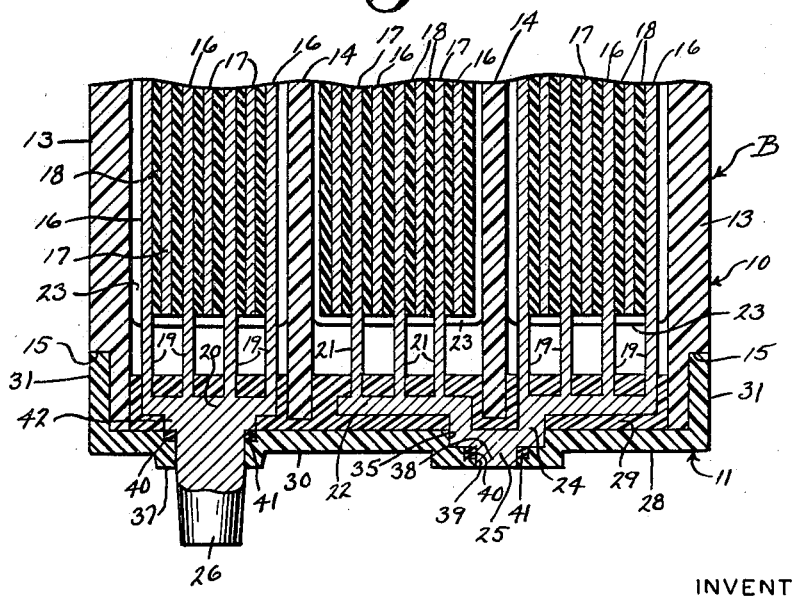
INVENTOR
JOHN K. SHANNON
BY *Wright & Wright*
ATTORNEYS

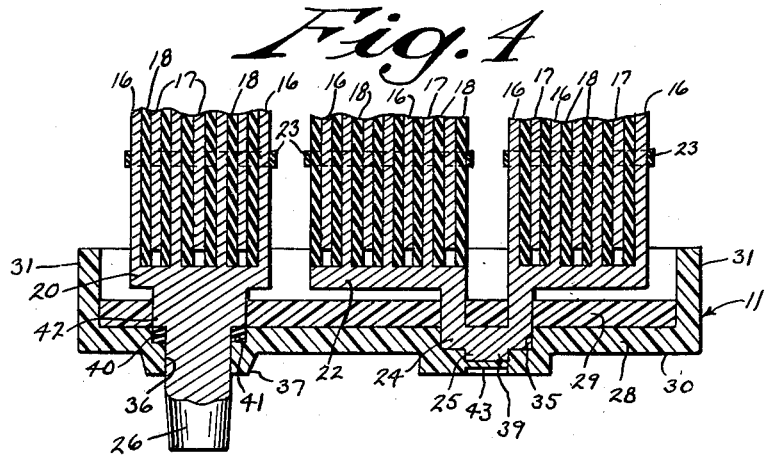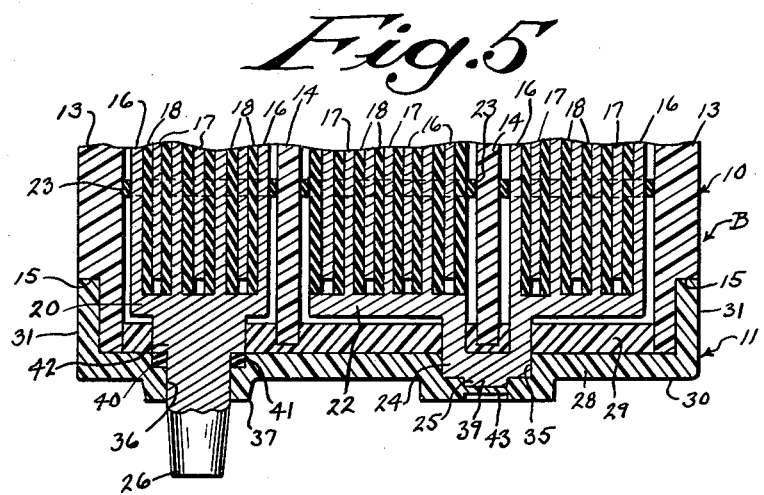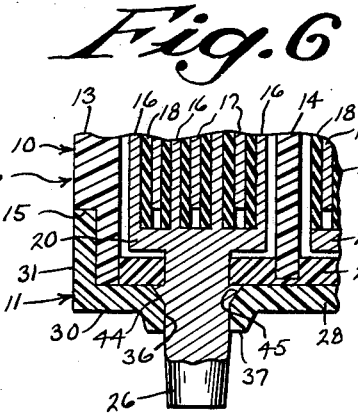

United States Patent Office 3,194,867
Patented July 13, 1965

3,194,867
METHOD OF CONSTRUCTING STORAGE BATTERY COVERS AND THE UNITING OF THE SAME WITH STORAGE BATTERY CASES AND BATTERY ELEMENTS
John K. Shannon, 2028 63rd Place, Kenosha, Wis.
Original application Feb. 20, 1961, Ser. No. 90,487. Divided and this application Mar. 5, 1962, Ser. No. 177,312
2 Claims. (Cl. 264—263)

This invention appertains to a novel method of forming storage battery covers and uniting the same with storage battery cases and cell assemblies to form a substantially integral one-piece unit, and is a division of my pending application Ser. No. 90,487, filed February 20, 1961, and entitled "Storage Battery."

As brought out in the pending application, it is customary in the art of storage batteries to mold a hard rubber or plastic cover as a separate piece to fit into or over the edges of a battery cell case or container and the thickness of the cover corresponds to the thickness of the battery case to give a desired rugged structure. When the covers fit into the containers and cells thereof, a space is provided between the container walls and the cover into which a sealant material is applied which holds the cover in position and for the purpose of preventing solution and gases from escaping between a cover and a container. The covers are of sufficient strength in themselves to hold up physically in normal usage.

One of the primary objects of this invention is to provide an ornamental thin-walled outer cover (which would not in itself withstand the abuses of normal usage), and a simple method of attaching the same to a battery container, in such a way as to strengthen the outer cover physically so that it can withstand the abuses of normal usage.

Another salient object of the invention is to provide a novel method of forming a storage battery container cover which consists in first premolding an outer ornamental thin wall section; and second utilizing such preformed thin wall outer section as a mold tray for receiving a free flowing plastic material unitable with the outer section to form an inner reinforcing section with means for uniting the cover with the battery case while the inner section is in a free flowing condition so that the inner section will unite both with the outer section of the cover and the battery case to form a homogeneous whole.

A further important object of the invention is the provision of a novel method of enclosing and protecting the connector straps, shoulders etc. of the battery plates and cells during the molding of the inner and outer cover sections directly on a battery case, which consists in first supporting a thin-walled premolded outer cover section in an inverted position in a horizontal plane; second, properly positioning the connected cell plate sets in the outer cover section with the terminal posts projecting through holes provided in said cover section; third, pouring a desired amount of plastic material in the outer cover section to a certain level for covering and enveloping portions of the plate lugs or shoulders and the cell connector or jump straps; fourth, sliding a premolded battery case in an inverted position over the plates and into the plastic material, and finally, allowing the plastic material to solidify and join the outer cover section and the edges of the battery case, cell connectors and plate shoulders, it being understood that the material from which the outer cover section and the resultant inner cover section is formed, is compatible so as to unite and provide a single, rugged, united structure.

With these and other objects in view, the invention consists in the novel construction, arrangement and formation of parts, as will be hereinafter more particularly described and claimed, and illustrated in the accompanying drawings, in which drawings:

FIGURE 1 is a perspective view of a storage battery constructed in accordance with my method;

FIGURE 2 is a perspective view of one preferred type of outer cover section with the same in its inverted position to form a mold tray in accordance with one of the first steps in my method;

FIGURE 3 is a fragmentary longitudinal sectional view through a completed battery made in accordance with my method, the view showing the material of the inner cover section enveloping plate lugs, connectors and jump straps and with the material of the inner cover section solidified and united with the outer cover section and with the battery case, the section being taken on the line 3—3 of FIGURE 2, looking in the direction of the arrows;

FIGURE 4 is a fragmentary longitudinal sectional view showing a slightly modified form of the invention and another step in my method of bringing about the invention, the view showing more particularly the outer cover section in its inverted position with the connected cell plate sets in position and with the material of the inner cover section being poured into the premolded outer cover section and prior to the placing of the container or battery case in position;

FIGURE 5 is a view similar to FIGURE 4, but showing the battery case or container placed in position in accordance with a further step of my method;

FIGURE 6 is a fragmentary detail longitudinal sectional view, showing a slightly further modified form of means for connecting and sealing a terminal post with the cover, and FIGURE 7 is a fragmentary detail sectional view showing the outer cover section of an extreme thinness.

Referring to the drawings in detail, wherein similar reference characters designate corresponding parts throughout the several views, the letter B generally indicates a storage battery embodying the novel features of this invention. As illustrated, the battery B includes a premolded case or container 10 and my novel cover 11.

The battery case 10 can be molded from hard rubber or any other preferred type of plastic material and is of substantially the same type and character as now employed in storage batteries on the market. Thus, the case 10 includes side walls 12 and end walls 13. The side walls 12 are joined by transversely extending partition walls 14 which form in conjunction with the container walls individual cell compartments. As illustrated a three cell battery has been indicated, but it is to be understood that more or less cells can be employed. While I have stated that the case 10 is of substantially the same charatcer as employed in storage batteries now on the market and in general use, it is to be understood that the upper edges of the side walls 12 and end walls 13 are formed as well as the partition walls 14 in such a way as to insure the proper molding of the cover 11 thereon so that the cover and case will be correctly united to form a substantially homogeneous unit. Thus, the outer edges of the side and end walls 12 and 13 are reduced in thickness to provide a peripheral shoulder or seat 15. While I have shown this seat 15 formed exteriorly of the case, it is to be understood that the seat could be formed on the inner faces of the side and end walls.

Each cell of the battery B receives a set of alternately arranged positive and negative plates 16 and 17. The positive and negative plates are held in proper spaced position by separators 18. The positive plates 16 have their lugs 19 joined by shoulders or connectors 20. The negative plates 17 have their lugs 21 joined by shoulders or connectors 22. The sets of plates and separators are preferably bound together by a rubber or like band 23. The positive set of plates of one cell are electrically connected to the negative set of plates of an adjacent cell by jump or connector straps 24. These jump or connector straps 24 are preferably, but not necessarily, formed with bosses 25 for a purpose which will be later set forth, but it is to be understood that where these bosses are utilized, the same form test points for cells and this is best shown in FIGURES 3, 4 and 5. The end cells of the battery are provided with terminal posts 26 and 27. The terminal post 26 is carried by and electrically connected with a positive set of plates, while the terminal post 27 is carried by and electrically connected with a negative set of plates. The terminal posts project a material distance beyond the outer surface of the cover.

In order to bring about the molding of the cover 11 on the battery case and the envelopment of the plate lug shoulders and connector straps by plastic material, I form the cover of outer and inner sections 28 and 29. The outer cover section 28 is premolded to the proper dimensions according to the size of the battery being made and this premolded outer section 28 includes a top wall 30 and depending peripheral flanges 31. This section can be made from various materials, such as rubber, or a desired plastic material or combination of materials. However, the material from which the outer cover section 28 is made is compatible with the plastic material of the inner cover section 29. The cover section 28 has its walls 30 and 31 formed from a thin section of material, and is made to give a complete finished appearance so as to add to the appearance of the entire battery. As the section 28 is formed with thin walls, the same can be quickly and economically molded and when the same is in an inverted position, as shown in FIGURE 2, the wall 30 and flanges 31 form a complete tray or mold, as will be hereinafter more fully set forth.

The wall 30 has its inner surface substantially flat except for spaced annular rings 32 which form dams around the vent openings 33 of the battery. The outer face of the wall 30 has formed thereon upstanding rings 34 around the vent openings and these rings 34 form, in effect, continuations of the rings 32 and provide means for receiving vent caps. The inner face of the wall 30 has also formed therein depressions or wells 35 which form seats for receiving and supporting the connector straps 24. Also formed in the section 28 are openings 36 adjacent to the ends of the battery for receiving the terminal posts 26 and 27. The openings 36 can be surrounded by annular reinforcing flanges 37. In view of the fact that the section 28 is formed with a thin wall, it is advisable to thicken the wall 30 at the depressions or wells 35. As shown in the preferred form of the invention FIGS. 1, 2 and 3, the cover wall 30 can be provided with openings 38 for receiving test bosses 39 formed on the connector or jump straps 24, and these bosses fitting in the openings also aid in sustaining the groups of battery plate sets in their upright position when the same are associated with the section 28. As best illustrated in FIG. 3, the openings 36 for the terminal posts 26 and 27 and openings 38 for test bosses 39 can have their walls rabbeted, as at 40, to receive gaskets 41 to bring about a seal around the terminal posts and test bosses 39 to prevent the escape of the material which forms the inner cover section 29. As heretofore brought out, the side and end walls or flanges 31 of the section 28 are of such a size as to accommodate, receive and encompass the upper edges of the side and end walls 12 and 13 of the battery case 10, and the lower edges of these flanges snugly fit on the shoulders 15. The terminal posts 26 and 27 have formed thereon shoulders 42 which rest on the gaskets 41 when the posts are inserted into their openings and these shoulders form a stop which determines the distance that the posts extend through the cover and these shoulders on the posts in conjunction with the connector or jump straps 24 are also determine the distance between the plate lugs and their connectors from the inner surface of the cover section 28. The gaskets 41 can be made of resilient material for intimate contact with the posts and the test bosses.

With the cell plates, lugs, shoulders, connector straps and terminal posts properly formed, the plates are arranged in their proper order within and on the inner face of the outer section 28. The terminal posts 26 and 27 are placed in their openings 36 and the jump straps are placed in their seats 35 with the test bosses 39 fitting in their openings 38. The jump straps 25 and shoulders on the terminal posts 26 and 27 are supports for the plates in the outer cover or mold section.

The inner cover section 29 is now ready to be formed and the plastic material from which the inner cover section is made is now poured in its flowing state into the outer cover section 28 to the desired level. This level can be sufficient to completely cover, enclose and envelop the plate lug shoulders or connectors, the connector or jump straps 24 for the plate seats, with the exception of the outer faces of the jump straps which rest against the lower walls of the wells 35.

The plastic material from which the section 29 can be made, by way of example, can be epoxy resin, phenolics or the like, and from the same material as the outer cover section 28, and preferably from a material which is compatible with the material from which the battery case 10 is made, so that the material from the inner section 29 will mingle with the material from which the outer section and cover is made to form a homogeneous single unit.

With the plastic material poured into the outer cover section to a desired level, the battery case 10 is now inverted and inserted into the cover with the edges of its side and end walls forced into the fluid plastic and this plastic will flow around the edges of the side and end walls of the case and on the seat 15. When the cover material solidifies, the entire battery can then be turned right side up for further processing or use. Actually, if so desired, the shoulder 15 can be placed an exact distance from the wall edges so that a slight space will be formed between the outer wall 30 of the section 28 so that the fluid plastic will flow under the same and there can be a slight space between the flanges 31 of the outer cover section and the walls of the case to permit the flow of plastic material around the same.

Great stress is laid on the fact that the outer cover section is a decorative retainer or mold for the plastic material for the inner cover section 29 which is poured into the outer section to form the complete battery cover, which in turn is molded to the battery case and various cell connectors, shoulders and terminal posts of the battery and that this mold or outer cover section stays with the battery and becomes a permanent part thereof.

The inner cover section 29 when united with the outer cover section 28 effectively reinforces the outer cover section and materially increases the thickness of the wall 30 and hence this cover 11 is enabled to withstand normal shocks and usage.

In FIGURES 4, 5 and 6, I have shown a slightly modified form of the invention and in this form the plate lug shoulders are disposed above the level of the poured material for the inner section 29, and in this form, and before the inverting of the battery, the outer cover section 28 can be rocked back and forth to splash the plastic material of the inner cover section 29 on the lug shoulders and connector straps to coat the same and adjacent battery case wall parts.

Also, as shown in FIGS. 4 and 5, the openings for the bosses 39 need not extend all the way through the cover, but a frangible thin section part 43 can be left over the bosses and when it is desired to test cell plates, the thin section 43 can be broken to expose the test bosses.

As shown in FIG. 6, I may omit the flexible or resilient gaskets or grommets 41 and in lieu thereof, tapered shoulders 44 on the terminal posts with tapered seats 45 around the walls of the terminal post openings may be provided. The tapered shoulders and tapered seats form a good seal and support for the terminal posts.

In FIG. 7 I have shown the outer cover section 28 of an extreme thinness, so as to merely form a shell which can be economically made and which will still form the desired mold for the inner reinforcing section 29. The view also illustrates the space between the top wall 30 of the cover section 28 and the side walls or flanges 31 spaced from the battery case to permit the flow of the fluid material from which the inner cover section 29 is formed between the cover and the case so as to insure the binding of the cover with the same.

From the foregoing description, it can be seen that I have provided a novel means and method for molding a one-piece cover directly on a battery case and in such a manner that plate lug shoulders, cell connector straps etc. can be completely embedded within the cover itself.

Changes in details may be made without departing from the spirit or the scope of this invention, but what I claim as new is:

1. A method for forming a storage battery which comprises molding a storage battery casing having a bottom, end, and side walls, molding a thin-walled outer section having a finished appearance and provided with a top wall and depending flanges, inverting the said outer section to form a mold tray, affixing cell plates thereto, and filling said outer section to a height which corresponds to at least the thickness of said outer section with solidifiable plastic material which is compatible with the material of said outer section, inverting said storage battery case and inserting the upper edges of said case into the material in said outer section while said plastic material is in a moldable state and solidifying the material of said outer section whereby, upon solidification, a homogeneous battery cover and case is formed, around said cell plates.

2. A method for forming a storage battery which comprises molding a storage battery casing having a bottom, end, and side walls, molding a thin-walled outer section having a finished appearance and provided with a top wall and depending flanges, said top wall being formed with test boss openings, terminal post openings and vent openings, each vent opening being surrounded with an annular reinforcing flange which projects from the top wall in the same direction as said depending flanges, inverting said outer section to form a mold tray, affixing a plurality of cell plates with jump straps connecting said cell plates and with terminal posts to said outer section to seal said test boss openings and said terminal post openings, and filling said outer section to a height which corresponds to at least the thickness of said outer section with solidifiable plastic material which is compatible with the material of said outer section, inverting said storage battery case and inserting the upper edges of said case into the material in said outer section while said plastic material is in a moldable state and solidifying the material of said outer section whereby, upon solidification, a homogeneous battery cover and case is formed around said cell plates.

References Cited by the Examiner

UNITED STATES PATENTS

| | | | |
|---|---|---|---|
| 2,880,261 | 3/59 | Duncan | 136—170 X |
| 2,889,423 | 6/59 | Yochum | 264—272 |
| 2,934,989 | 5/60 | Belli et al. | |
| 2,965,933 | 12/60 | Kasten | 18—59 |
| 3,037,070 | 5/62 | Sussman et al. | 18—59 X |
| 3,120,572 | 2/64 | Shannon | 264—261 |

ROBERT F. WHITE, *Primary Examiner.*

ALEXANDER H. BRODMERKEL, *Examiner.*